United States Patent
Hu et al.

(10) Patent No.: US 9,471,168 B2
(45) Date of Patent: Oct. 18, 2016

(54) TOUCH SCREEN, TOUCH SENSING DEVICE AND A METHOD OF DRIVING THE SAME

(71) Applicant: HIMAX TECHNOLOGIES LIMITED, Tainan (TW)

(72) Inventors: Chia-Wei Hu, Tainan (TW); Yaw-Guang Chang, Tainan (TW); Shen-Feng Tai, Tainan (TW); Wai Pan Wu, Tainan (TW)

(73) Assignee: Himax Technologies Ltd., Tainan (TW)

( * ) Notice: Subject to any disclaimer, the term of this patent is extended or adjusted under 35 U.S.C. 154(b) by 38 days.

(21) Appl. No.: 14/626,361

(22) Filed: Feb. 19, 2015

(65) Prior Publication Data

US 2016/0103535 A1     Apr. 14, 2016

Related U.S. Application Data

(60) Provisional application No. 62/062,102, filed on Oct. 9, 2014, provisional application No. 62/069,129, filed on Oct. 27, 2014, provisional application No. 62/072,314, filed on Oct. 29, 2014.

(51) Int. Cl.
  *G06F 3/041* (2006.01)
  *G06F 3/044* (2006.01)
  *G09G 3/34* (2006.01)
  *G09G 3/36* (2006.01)

(52) U.S. Cl.
  CPC ............ *G06F 3/0412* (2013.01); *G06F 3/044* (2013.01); *G09G 3/3406* (2013.01); *G09G 3/3648* (2013.01); *G06F 2203/04111* (2013.01); *G06F 2203/04112* (2013.01)

(58) Field of Classification Search
  CPC .... G06F 3/044; G06F 3/0412; G06F 3/0416; G02F 1/13338
  USPC .................................................. 345/173, 174
  See application file for complete search history.

(56) References Cited

U.S. PATENT DOCUMENTS

| | | | | |
|---|---|---|---|---|
| 9,024,913 B1* | 5/2015 | Jung | ........................ | G06F 3/044 178/18.06 |
| 2014/0111466 A1* | 4/2014 | Kim | ........................ | G06F 3/044 345/174 |
| 2015/0268745 A1* | 9/2015 | Li | ........................... | G06F 3/044 345/173 |
| 2016/0062502 A1* | 3/2016 | Liu | ......................... | G06F 3/044 345/174 |

FOREIGN PATENT DOCUMENTS

| KR | 10-2012-0069234 A | 6/2012 |
|---|---|---|
| KR | 10-2014-0019750 A | 2/2014 |

OTHER PUBLICATIONS

Office Action Dated Jun. 15, 2016 in corresponding Korean Patent Application No. 10-2015-0109562.

* cited by examiner

*Primary Examiner* — Koosha Sharifi-Tafreshi
(74) *Attorney, Agent, or Firm* — Donald E. Stout; Stout, Uxa & Buyan, LLP

(57) ABSTRACT

A touch sensing device includes a first conductive layer that acts as a common voltage layer in a display mode; and a second conductive layer electrically isolated from the first conductive layer, the second conductive layer having source lines that transfer data to be displayed in the display mode and act as transmitting (TX) electrode lines in a touch sensing mode. The first conductive layer includes RX electrode lines and blocks that are disposed among and separated by the RX electrode lines. The RX electrode lines and the blocks are electrically connected to a common voltage in the display mode.

21 Claims, 13 Drawing Sheets

TOUCH SCREEN, TOUCH SENSING DEVICE AND A METHOD OF DRIVING THE SAME

CROSS-REFERENCE TO RELATED APPLICATIONS

This application claims the benefit of U.S. Provisional Application No. 62/062,102, filed on Oct. 9, 2014, U.S. Provisional Application No. 62/069,129, filed on Oct. 27, 2014, and U.S. Provisional Application No. 62/072,314, filed on Oct. 29, 2014. The entire contents of the foregoing applications are expressly incorporated by reference herein.

BACKGROUND OF THE INVENTION

1. Field of the Invention

The present invention generally relates to a touch screen, and more particularly to a liquid crystal display embedded with a touch sensing device.

2. Description of Related Art

A touch screen is an input/output device that combines touch technology and display technology to enable users to directly interact with what is displayed. A capacitor-based touch panel is a commonly used touch panel that utilizes capacitive coupling effect to detect touch position. Specifically, capacitance corresponding to the touch position changes and is thus detected, when a finger touches a surface of the touch panel.

In order to produce thinner touch screens, in-cell technology has been adopted that eliminates one or more layers by building capacitors inside the display. Conventional in-cell touch screens, however, require separate architectures or schemes for driving the display part and the touch part. Accordingly, a need has arisen to propose a novel in-cell architecture and scheme of a touch screen that has a more compact form factor and greater driving efficiency.

SUMMARY OF THE INVENTION

In view of the foregoing, it is an object of the embodiment of the present invention to provide a touch screen embedded with a touch sensing device that has compact form factor and performs in an efficient manner.

According to one embodiment, a touch screen includes a first conductive layer, a second conductive layer, a light control layer and a driver. The first conductive layer acts as a common voltage layer in a display mode. The second conductive layer is electrically isolated from the first conductive layer, and has source lines that transfer data to be displayed in the display mode and that act as transmitting (TX) electrode lines in a touch sensing mode. The light control layer is disposed above the first conductive layer and the second conductive layer. The driver acts as a source driver to provide data to be displayed to the source lines in the display mode, and acts as a TX driver to provide transmitting signals in the touch sensing mode. The first conductive layer includes RX electrode lines and blocks that are disposed among and separated by the RX electrode lines, the RX electrode lines and the blocks being electrically connected to a common voltage in the display mode.

DETAILED DESCRIPTION OF THE INVENTION

Figure 1A:
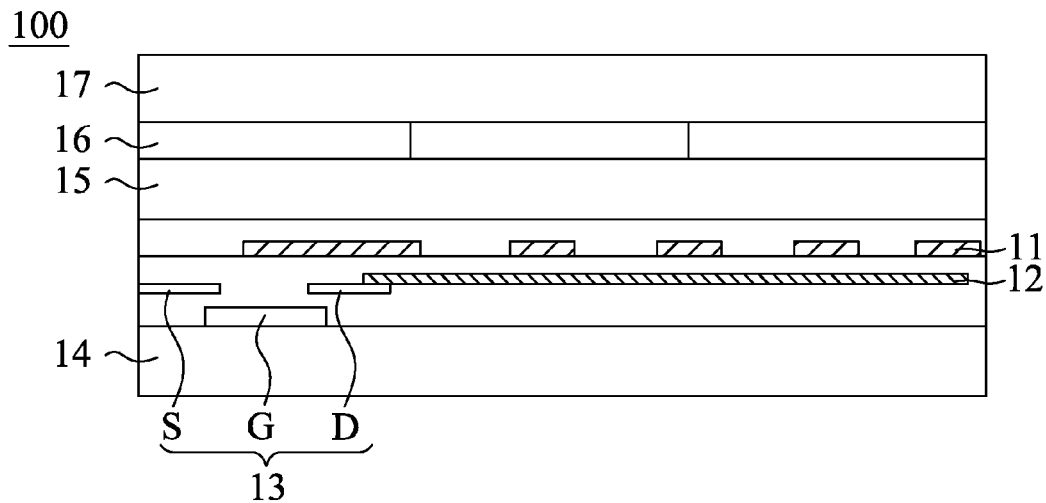
FIGS. 1A-1C show cross-sectional views illustrated of a touch screen according to a first embodiment of the present invention.
Figure 1B:
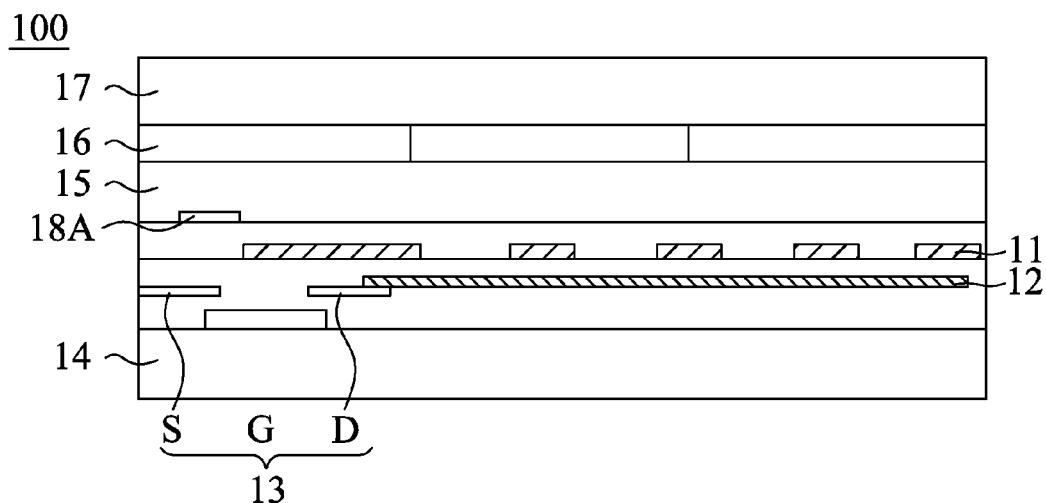
Figure 1C:
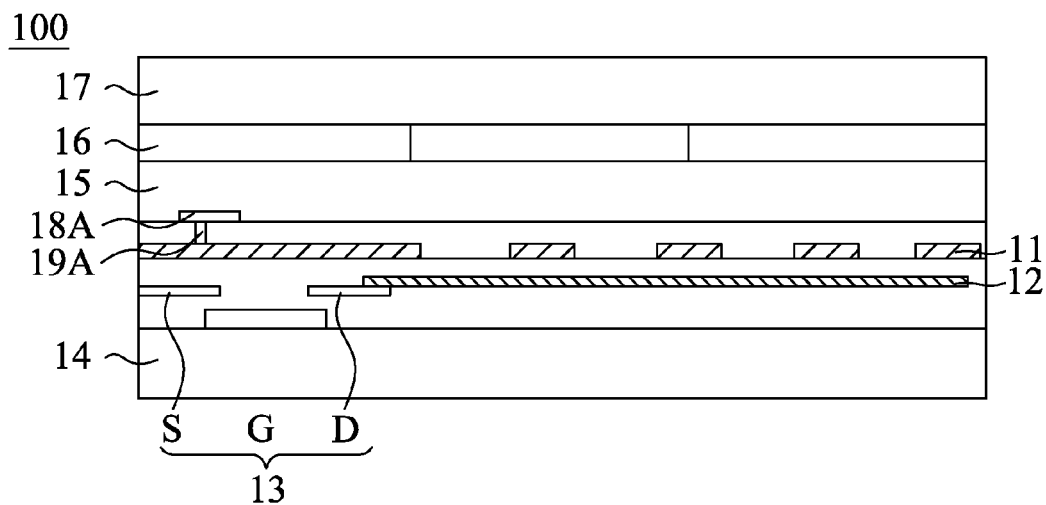
Figure 2A:
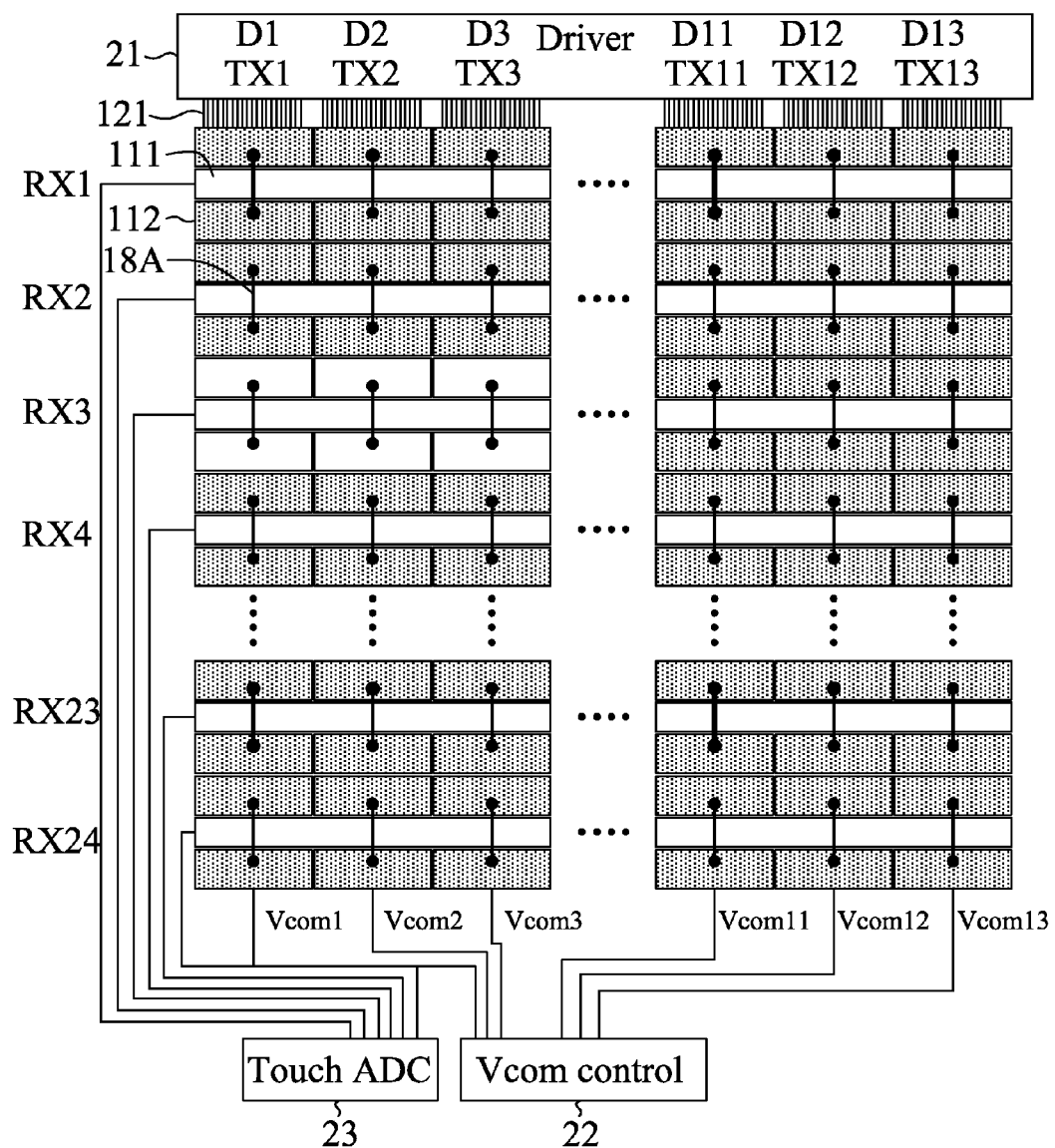
FIG. 2A shows a top view illustrated of the first conductive layer of FIG. 1.
Figure 2B:
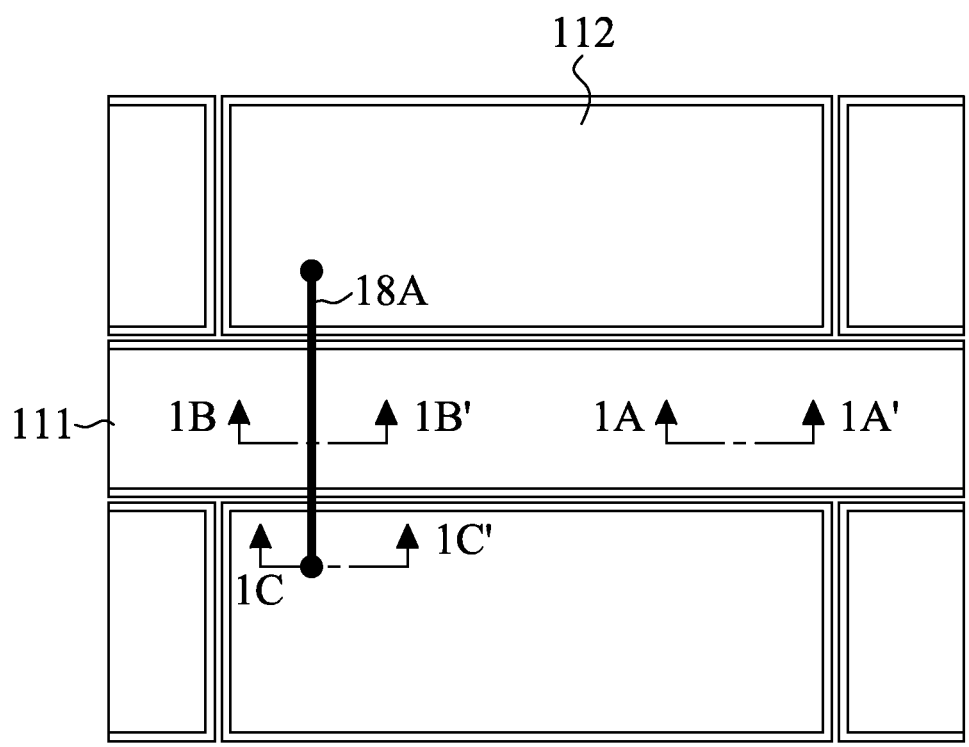
FIG. 2B shows a partial enlarged view of FIG. 2A.

FIGS. 1A-1C show cross-sectional views illustrated of a touch screen 100 according to a first embodiment of the present invention. The touch screen 100 of the embodiment is a liquid crystal display (LCD) embedded with a touch sensing device. In the embodiment, the touch screen 100 includes, among others, a first conductive layer 11 that acts as a common voltage (Vcom) layer for the LCD when the touch screen is in a display mode, and acts as a receiving (RX) electrode layer when the touch screen 100 is in a touch sensing mode. FIG. 2A shows a top view illustrated of the first conductive layer 11 of FIG. 1, and FIG. 2B shows a partial enlarged view of FIG. 2A.

The touch screen 100 further includes a second conductive layer 12 being disposed below and electrically isolated from the first conductive layer 11. The second conductive layer 12 has source (or data) lines 121 respectively connected to thin-field transistors (TFTs) 13, each being, for example, comprised of a source (S), a drain (D) and a gate (G). The source lines 121 (e.g., D1-13 in FIG. 2A) transfer data to be displayed in the display mode, and act as transmitting (TX) electrode lines (e.g., TX1-TX13 in FIG. 2A) in the touch sensing mode.

As shown in FIG. 1A, the touch screen 100 may include a TFT substrate 14, on which the TFTs 13 are formed. A light control layer, such as a liquid crystal (LC) layer 15, is disposed above the first conductive layer 11. Above the LC layer 15 are color filters (CFs) 16 that are formed on a bottom surface of a CF substrate 17.

Although the second conductive layer 12 is disposed below the first conductive layer 11 in the present and following embodiments, it is appreciated that the reverse may be adopted in other embodiments.

As shown in FIG. 2A, the touch screen 100 includes a driver 21 that acts as a source driver to provide data to be displayed in the display mode, and acts as a transmitting (TX) driver to provide transmitting signals in the touch sensing mode. According to one aspect of the embodiment, the first conductive layer 11 includes a plurality of RX electrode lines (e.g., elongated stripes) 111 that are disposed substantially perpendicular to the source lines 121. The first conductive layer 11 also includes a plurality of blocks 112 that are disposed among the RX electrode lines 111. The blocks 112 separated by the RX electrode line 111 are electrically connected by a (first) conductive bridge 18A, as detailed in FIG. 1B and FIG. 2B, disposed over the first conductive layer 11. As exemplified in FIG. 2A, the blocks 112 connected by the (first) conductive bridges 18A form Vcom1-Vcom13 column by column, respectively. The conductive bridge 18A is electrically connected to the first conductive layer 11 through a via 19A as detailed in FIG. 1C. In the display mode, all the RX electrode lines 111 and the blocks 112 are electrically connected to a common voltage (Vcom), for example, by a touch analog-to-digital converter (ADC) 23 and under control of a common voltage (Vcom) control unit 22. In the touch sensing mode, the blocks 112 are floating and the RX electrode lines 111 (e.g., RX1-RX24 in FIG. 2A) receive touch sensed signals, which are then processed, for example, by the touch ADC 23.

Figure 3A:
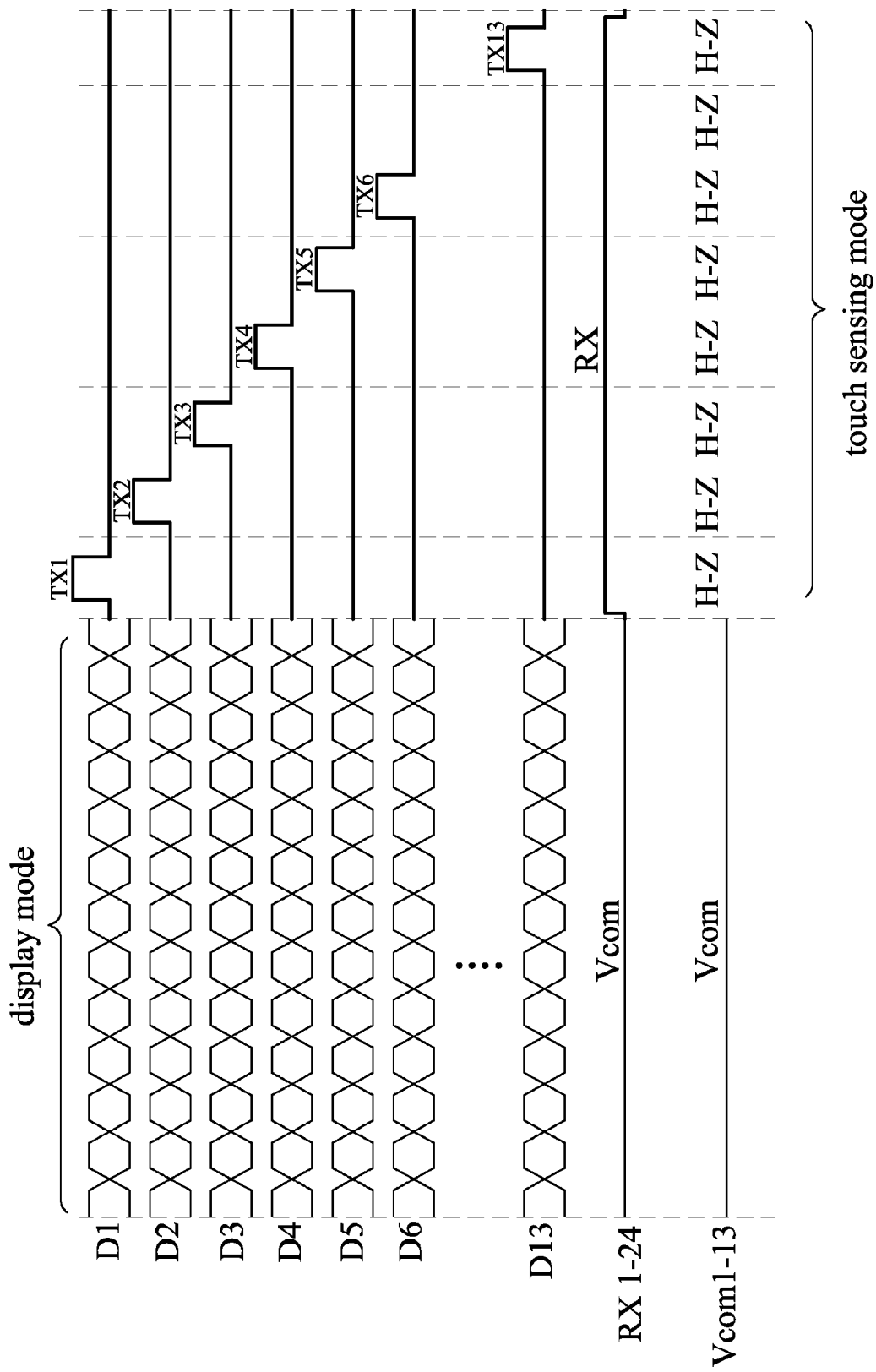
FIG. 3A and FIG. 3B show exemplary timing diagrams of driving the touch screen according to the first embodiment of the present invention.
Figure 3B:
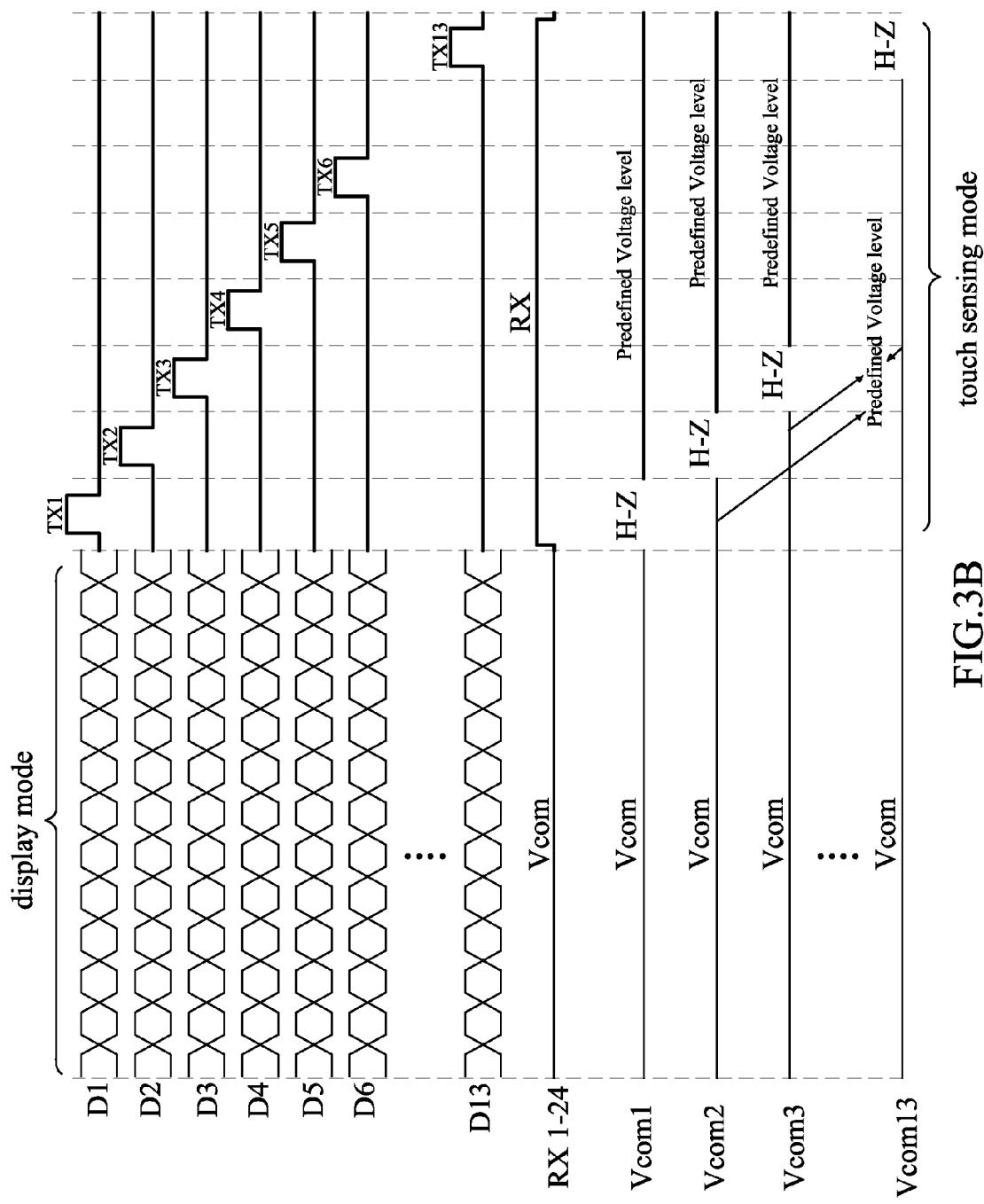

FIG. 3A shows an exemplary timing diagram of driving the touch screen 100 according to the first embodiment of the present invention. In the display mode, the driver 21 provides data (e.g., D0-D13) via the source lines 121, and the Vcom control unit 22 connects all the RX electrode lines 111 and the blocks 112 to a common voltage (Vcom). Subsequently, in the touch sensing mode, the driver 21 provides transmitting signals (e.g., TX1-TX13) in turn, and the touch ADC 23, for example, processes touch sensed signals RX received from the RX electrode lines 111. The blocks 112 are floating (i.e., in high impedance or H-z) under control of the Vcom control unit 22. FIG. 3B shows an alternative timing diagram of driving the touch screen 100 according to the first embodiment of the present invention. In the touch sensing mode, the block 112 associated with an active transmitting signal is floating, and other blocks 112 are maintained at a predefined voltage.

Figure 4:
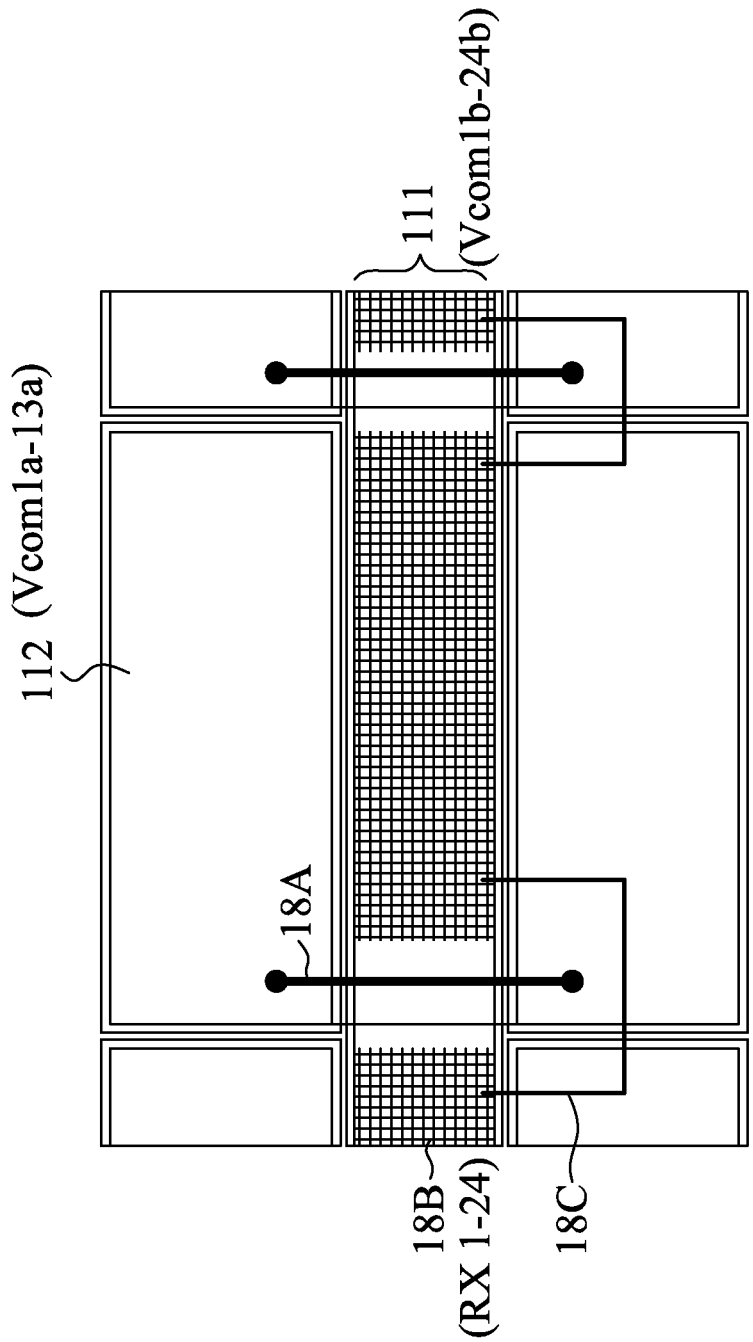
FIG. 4 shows a partial top view illustrated of the first conductive layer of a touch screen according to a second embodiment of the present invention.

FIG. 4 shows a partial top view illustrated of the first conductive layer 11 of a touch screen 200 according to a second embodiment of the present invention. The present embodiment is similar to the first embodiment with the exceptions that will be described in the following. As shown in FIG. 4, in addition to the conductive bridges 18A, conductive meshes 18B are disposed above the RX electrode line 111 but not connected with the conductive bridges 18A. In the embodiment, the conductive meshes 18B are formed on the same layer as the conductive bridges 18A. Neighboring conductive meshes 18B are electrically connected by a conductive link 18C. Moreover, a plurality of dummy meshes (not shown) may be respectively disposed above the blocks 112, and be electrically isolated from the conductive meshes 18B and the conductive links 18C.

Figure 5:
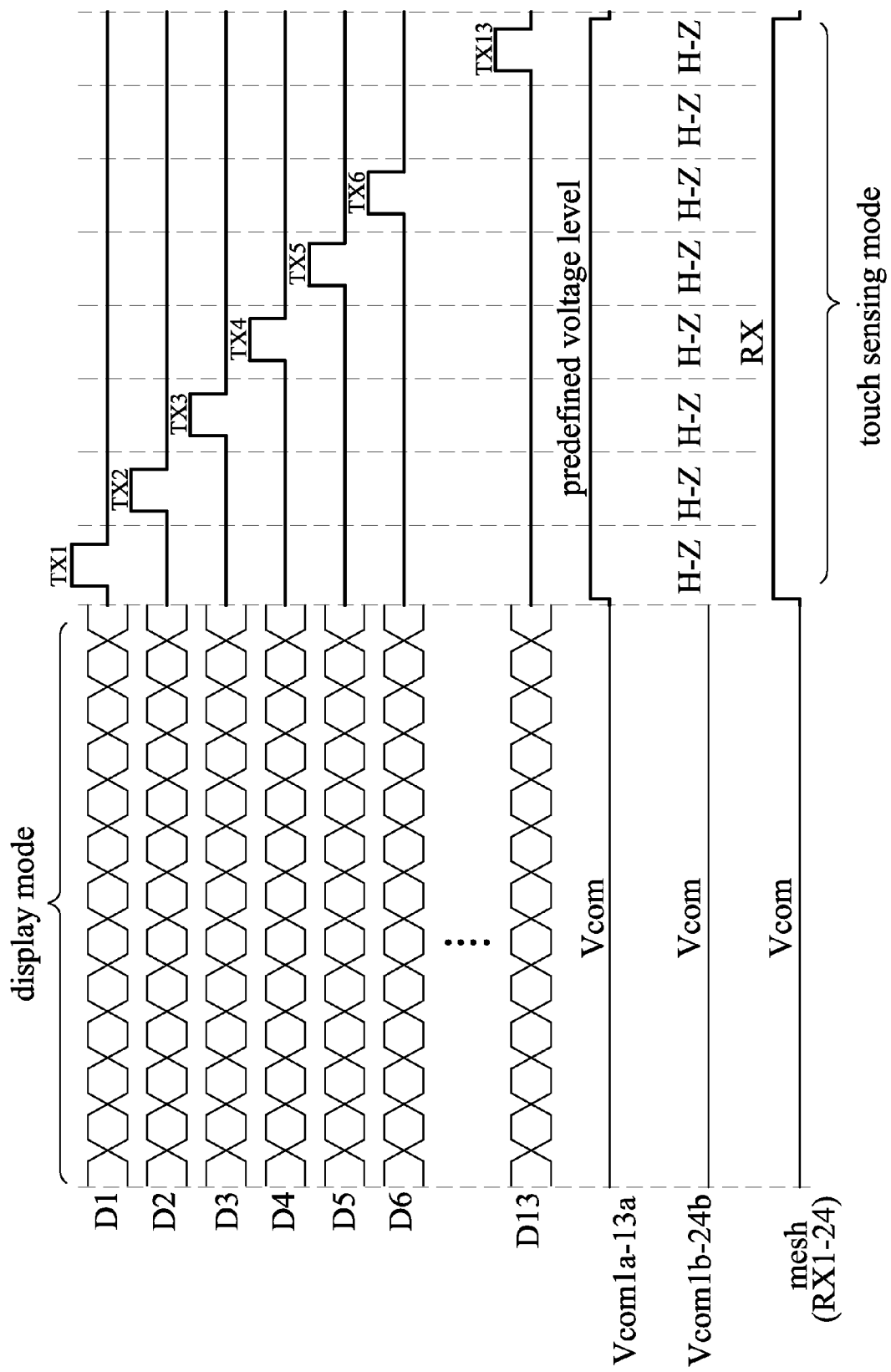
FIG. 5 shows an exemplary timing diagram of driving the touch screen according to the second embodiment of the present invention.

FIG. 5 shows an exemplary timing diagram of driving the touch screen 200 according to the second embodiment of the present invention. In the display mode, the driver 21 provides data (e.g., D0-D13) via the source lines 121, and the Vcom control unit 22 connects all the RX electrode lines 111, the blocks 112 and the conductive meshes 18B to a common voltage (Vcom). Subsequently, in the touch sensing mode, the driver 21 provides transmitting signals (e.g., TX1-TX13) in turn, and the touch ADC 23, for example, processes touch sensed signals RX received from the conductive meshes 18B. The RX electrode lines 111 (e.g., Vcom1a-13a) are maintained at a predefined voltage (e.g., provided by the touch ADC 23) or at ground or in high impedance, and the blocks 112 (e.g., Vcom1b-24b) are floating (i.e., in high impedance or H-z) under control of the Vcom control unit 22.

Figure 6A:
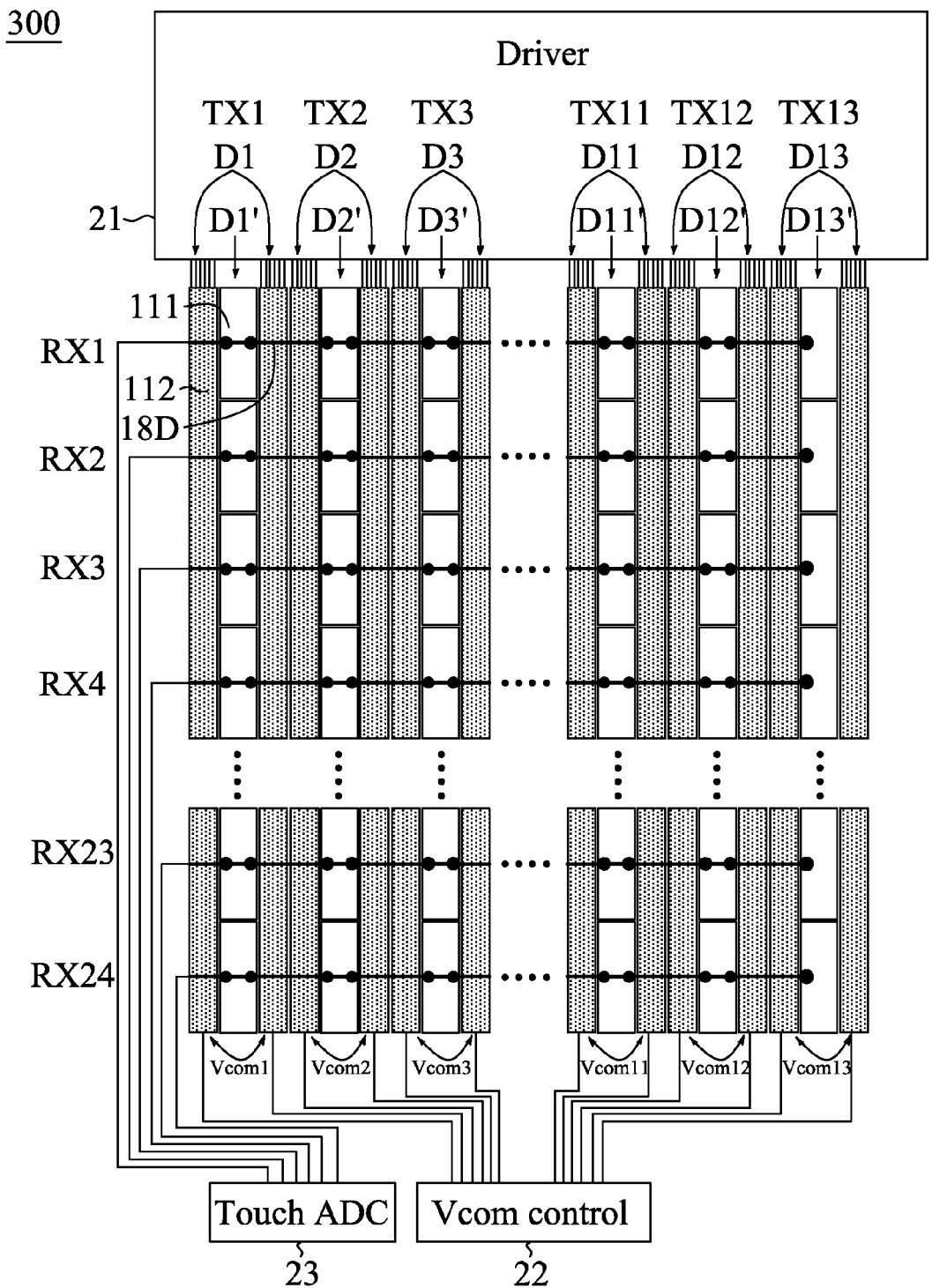
FIG. 6A shows a top view illustrated of the first conductive layer of a touch screen according to a third embodiment of the present invention.
Figure 6B:
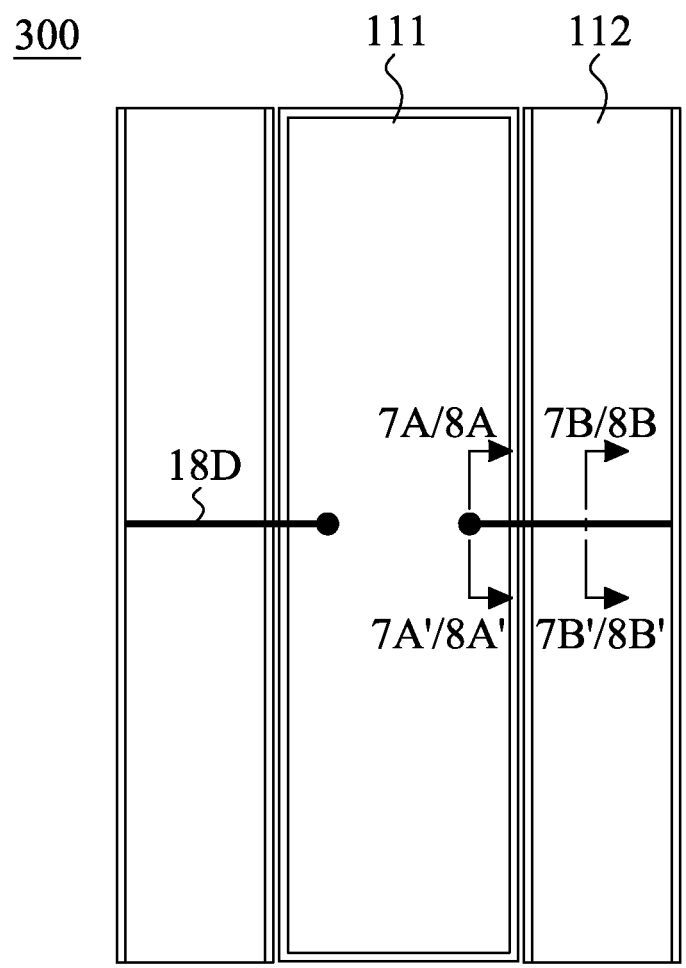
FIG. 6B shows a partial enlarged view of FIG. 6A.
Figure 7A:
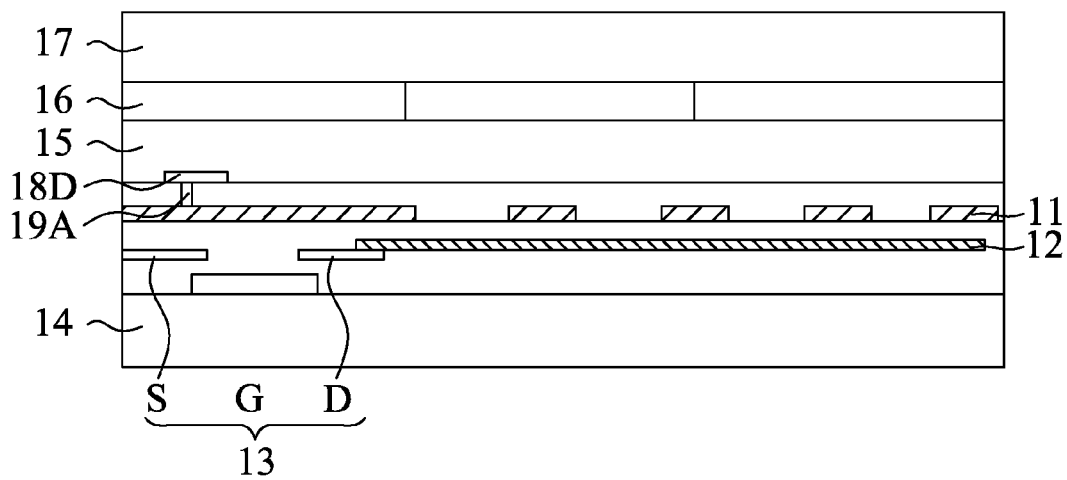
FIGS. 7A-7B show cross-sectional views illustrated of the touch screen according to the third embodiment of the present invention.
Figure 7B:
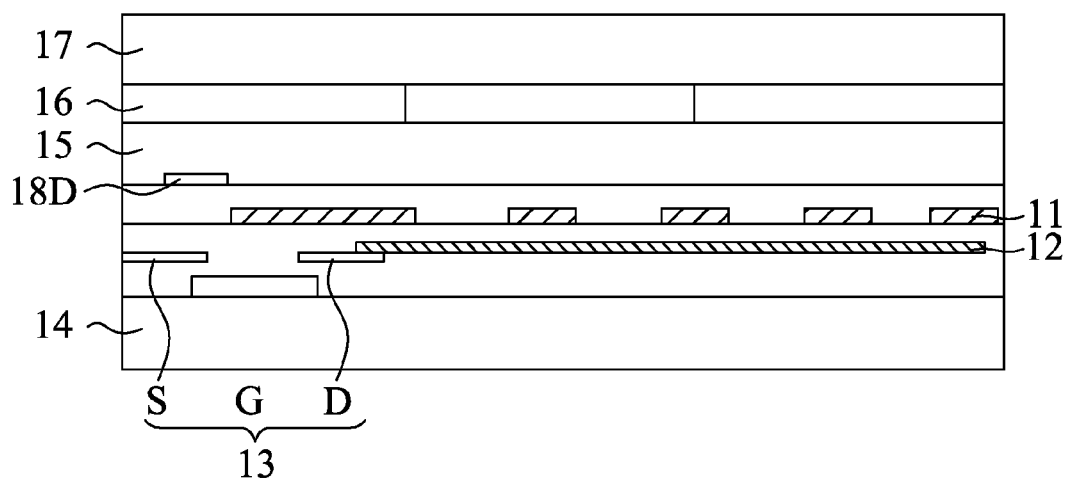
Figure 8A:
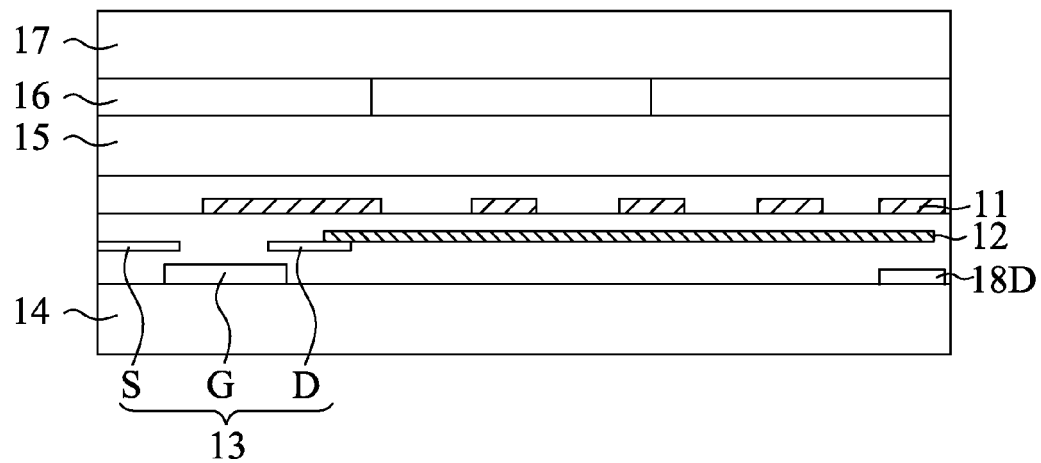
FIGS. 8A-8B show cross-sectional views illustrated of the touch screen according to an alternative third embodiment of the present invention.
Figure 8B:
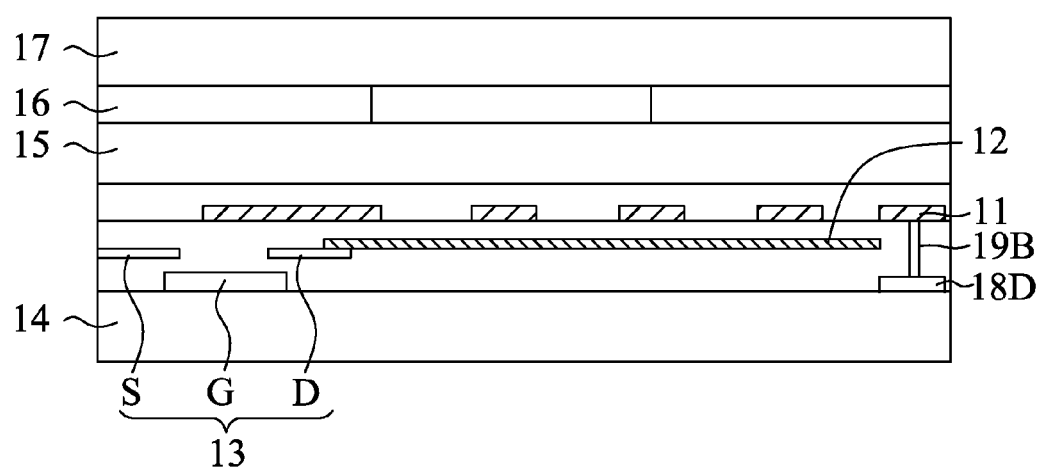

FIG. 6A shows a top view illustrated of the first conductive layer 11 of a touch screen 300 according to a third embodiment of the present invention, and FIG. 6B shows a partial enlarged view of FIG. 6A. Instead of an elongated strip, the RX electrode line 111 of the embodiment includes a plurality of segments that are electrically connected by a (second) conductive bridge 18D. In one embodiment, the conductive bridge 18D is electrically connected to the first conductive layer 11 through a via 19A as detailed in FIG. 7A, and the conductive bridge 18D is disposed over the first conductive layer 11 as detailed in FIG. 7B. In an alternative embodiment, the conductive bridge 18D is disposed below the second conductive layer 12 as detailed in FIG. 8A, and the conductive bridge 18D is electrically connected to the first conductive layer 11 through a via 19B as detailed in FIG. 8B.

Figure 9A:
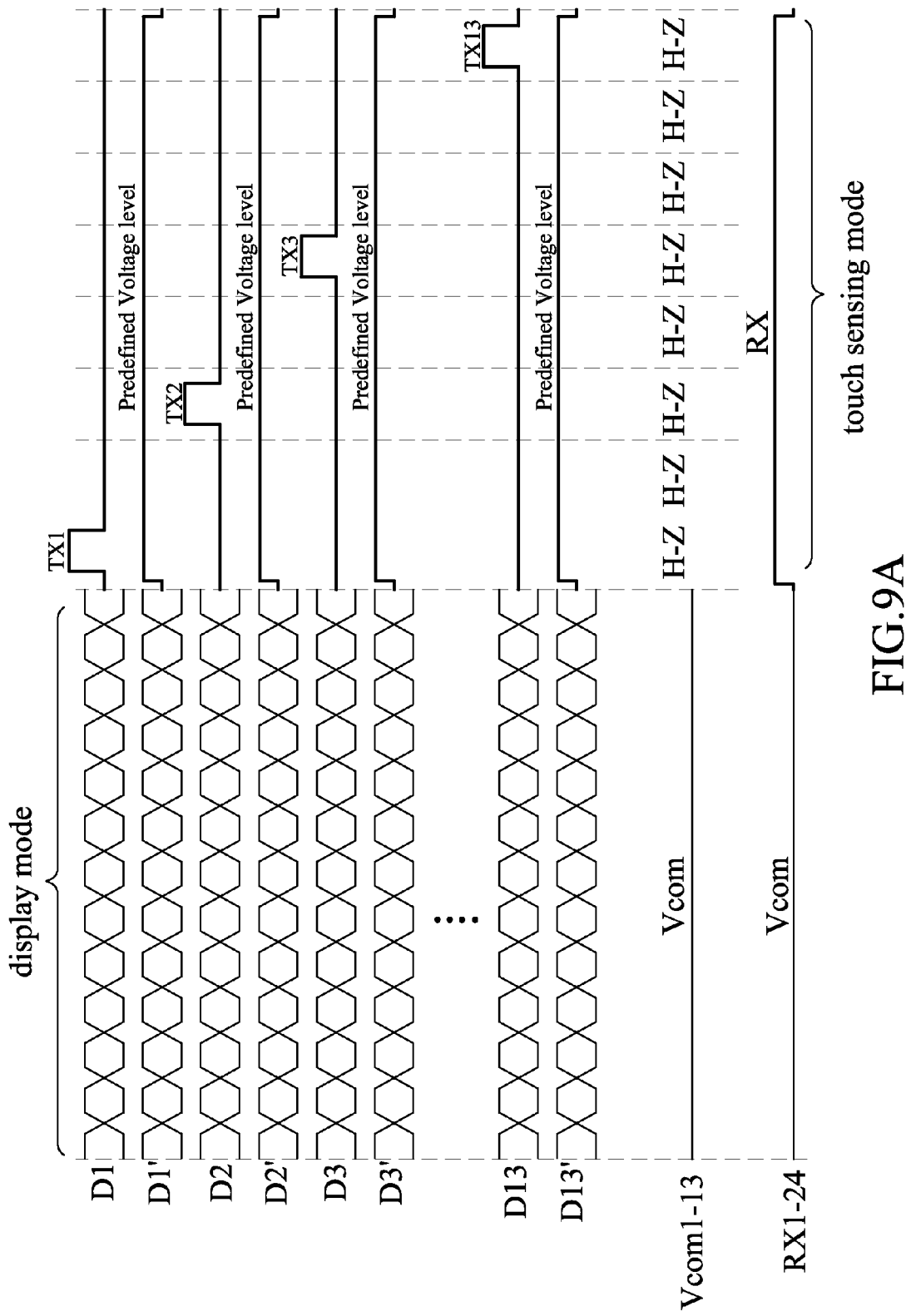
FIG. 9A and FIG. 9B show exemplary timing diagrams of driving the touch screen according to the third embodiment of the present invention.
Figure 9B:
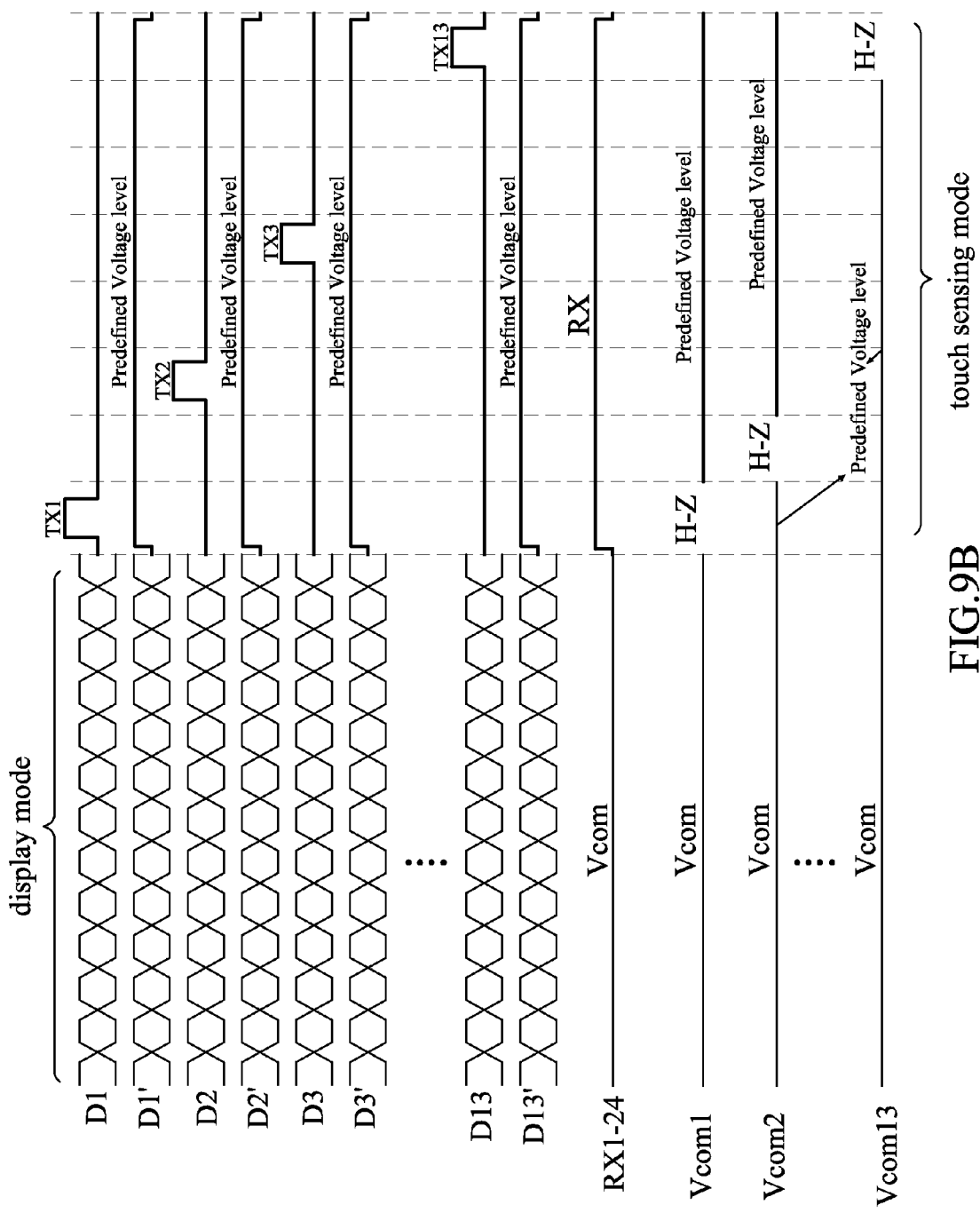

FIG. 9A shows an exemplary timing diagram of driving the touch screen 300 according to the third embodiment of the present invention. In the display mode, the driver 21 provides data via the source lines 121 below the blocks 112 (denoted as D1-D13) and below the RX electrode lines 111 (denoted as D1'-D13'), and the Vcom control unit 22 connects all the RX electrode lines 111 and the blocks 112 to a common voltage (Vcom). Subsequently, in the touch sensing mode, the driver 21 provides transmitting signals (e.g., TX1-TX13) in turn to the source lines 121 (e.g., D1-D13) below the blocks 112 while maintaining a predefined voltage or ground or high impedance at the source lines 121 (e.g., D1'-D13') below the RX electrode lines 111, and the touch ADC 23, for example, processes touch sensed signals RX received from the RX electrode lines 111. The blocks 112 (e.g., RX1-24) are floating (i.e., in high impedance or H-z) under control of the Vcom control unit 22. FIG. 9B shows an alternative timing diagram of driving the touch screen 300 according to the third embodiment of the present invention. In the touch sensing mode, the block 112 associated with an active transmitting signal is floating, and other blocks 112 are maintained at a predefined voltage.

Although specific embodiments have been illustrated and described, it will be appreciated by those skilled in the art that various modifications may be made without departing from the scope of the present invention, which is intended to be limited solely by the appended claims.

What is claimed is:

1. A touch screen, comprising:
   a first conductive layer that acts as a common voltage layer in a display mode;
   a second conductive layer electrically isolated from the first conductive layer, the second conductive layer having source lines that transfer data to be displayed in the display mode and act as transmitting (TX) electrode lines in a touch sensing mode;
   a light control layer disposed above the first conductive layer and the second conductive layer;
   a driver that acts as a source driver to provide data to be displayed to the source lines in the display mode, and acts as a TX driver to provide transmitting signals in the touch sensing mode;
   wherein the first conductive layer includes a plurality of RX electrode lines and a plurality of blocks that are disposed among and separated by the plurality of RX electrode lines, the plurality of RX electrode lines and the plurality of blocks being electrically connected to a common voltage in the display mode; and a plurality of first conductive bridges being disposed over the first conductive layer and connecting the plurality of blocks.

2. The touch screen of claim 1, further comprising:
a plurality of thin-field transistors (TFTs) connected to the source lines respectively; and
a TFT substrate, on which the TFTs are disposed.

3. The touch screen of claim 1, wherein the light control layer comprises a liquid crystal layer.

4. The touch screen of claim 1, wherein each said RX electrode line comprises a single elongated stripe along a direction perpendicular to the source lines.

5. The touch screen of claim 1, wherein at least one of the plurality of blocks is floating and the plurality of RX electrode lines receive touch sensed signals in the touch sensing mode.

6. The touch screen of claim 1, further comprising:
a plurality of conductive meshes disposed above the plurality of RX electrode lines but not connected with the plurality of first conductive bridges; and
a plurality of conductive links that connect the plurality of conductive meshes.

7. The touch screen of claim 6, further comprising a plurality of dummy meshes disposed above the plurality of blocks, and electrically isolated from the plurality of conductive meshes and the plurality of conductive links.

8. The touch screen of claim 6, wherein each said RX electrode line comprises a single elongated stripe along a direction perpendicular to the source lines.

9. The touch screen of claim 6, wherein at least one of the plurality of blocks is floating; the plurality of RX electrode lines are maintained at a predefined voltage, at ground or are floating; and the plurality of conductive meshes receive touch sensed signals in the touch sensing mode.

10. A touch screen, comprising:
a first conductive layer that acts as a common voltage layer in a display mode;
a second conductive layer electrically isolated from the first conductive layer, the second conductive layer having source lines that transfer data to be displayed in the display mode and act as transmitting (TX) electrode lines in a touch sensing mode;
a light control layer disposed above the first conductive layer and the second conductive layer;
a driver that acts as a source driver to provide data to be displayed to the source lines in the display mode, and acts as a TX driver to provide transmitting signals in the touch sensing mode;
wherein the first conductive layer includes a plurality of RX electrode lines and a plurality of blocks that are disposed among and separated by the plurality of RX electrode lines, the plurality of RX electrode lines and the plurality of blocks being electrically connected to a common voltage in the display mode;
wherein each said RX electrode line comprises a plurality of segments along a direction perpendicular to the source lines; and
a plurality of second conductive bridges that electrically connect each said RX electrode line.

11. The touch screen of claim 10, wherein at least one of the plurality of blocks is floating; the source lines below the plurality of RX electrode lines are maintained at a predefined voltage, at ground or are floating; and the plurality of RX electrode lines receive touch sensed signals in the touch sensing mode.

12. A touch sensing device, comprising:
a first conductive layer that acts as a common voltage layer in a display mode;
a second conductive layer electrically isolated from the first conductive layer, the second conductive layer having source lines that transfer data to be displayed in the display mode and act as transmitting (TX) electrode lines in a touch sensing mode;
wherein the first conductive layer includes a plurality of RX electrode lines and a plurality of blocks that are disposed among and separated by the plurality of RX electrode lines, the plurality of RX electrode lines and the plurality of blocks being electrically connected to a common voltage in the display mode; and
a plurality of first conductive bridges being disposed over the first conductive layer and connecting the plurality of blocks.

13. The touch sensing device of claim 12, wherein each said RX electrode line comprises a single elongated stripe along a direction perpendicular to the source lines.

14. The touch sensing device of claim 12, wherein at least one of the plurality of blocks is floating and the plurality of RX electrode lines receive touch sensed signals in the touch sensing mode.

15. The touch sensing device of claim 12, further comprising:
a plurality of conductive meshes disposed above the plurality of RX electrode lines but not connected with the plurality of first conductive bridges; and
a plurality of conductive links that connect the plurality of conductive meshes.

16. The touch sensing device of claim 15, further comprising a plurality of dummy meshes disposed above the plurality of blocks, and electrically isolated from the plurality of conductive meshes and the plurality of conductive links.

17. The touch sensing of claim 15, wherein each said RX electrode line comprises a single elongated stripe along a direction perpendicular to the source lines.

18. The touch sensing device of claim 15, wherein at least one of the plurality of blocks is floating; the plurality of RX electrode lines are maintained at a predefined voltage, at ground or are floating; and the plurality of conductive meshes receive touch sensed signals in the touch sensing mode.

19. A touch sensing device, comprising:
a first conductive layer that acts as a common voltage layer in a display mode;
a second conductive layer electrically isolated from the first conductive layer, the second conductive layer having source lines that transfer data to be displayed in the display mode and act as transmitting (TX) electrode lines in a touch sensing mode;
wherein the first conductive layer includes a plurality of RX electrode lines and a plurality of blocks that are disposed among and separated by the plurality of RX electrode lines, the plurality of RX electrode lines and the plurality of blocks being electrically connected to a common voltage in the display mode, each said RX electrode line comprising a plurality of segments along a direction perpendicular to the source lines; and
a plurality of second conductive bridges that electrically connect each said RX electrode line.

20. The touch sensing device of claim 19, wherein at least one of the plurality of blocks is floating; the source lines below the plurality of RX electrode lines are maintained at a predefined voltage, at ground or are floating; and the plurality of RX electrode lines receive touch sensed signals in the touch sensing mode.

21. A method of driving a touch sensing device, which including a first conductive layer and a second conductive layer having source lines, the first conductive layer including a plurality of RX electrode lines and a plurality of blocks, the method comprising:
- electrically connecting the plurality of RX electrode lines and the plurality of blocks to a common voltage in a display mode;
- transferring data to be displayed through the source lines in the display mode;
- floating at least one of the plurality of blocks in a touch sensing mode;
- maintaining the plurality of RX electrode lines at a predefined voltage, at ground or floating in the touch sensing mode; and
- receiving touch sensed signals via a plurality of conductive meshes disposed above the plurality of RX electrode lines in the touch sensing mode.

* * * * *